Dec. 3, 1968

G. T. PRUITT 3,414,392

GELS AND METHOD OF MAKING SAME

Filed July 24, 1964

INVENTOR.
Gail T. Pruitt
BY William D. Harris, Jr.
Attorney

United States Patent Office 3,414,392
Patented Dec. 3, 1968

3,414,392
GELS AND METHOD OF MAKING SAME
Gail T. Pruitt, Dallas, Tex., assignor to The Western Company of America, Fort Worth, Tex., a corporation of Delaware
Filed July 24, 1964, Ser. No. 384,964
13 Claims. (Cl. 44—7)

ABSTRACT OF THE DISCLOSURE

A gel having utility as a flame fuel. The gel is the reaction product of an unsaturated fatty acid, an aqueous solution of a base and a surfactant, when in the presence of a normally liquid organic fuel material. The base is preferably sodium hydroxide. The surfactant is preferably an N-substituted polyamine or an ethylene oxide adduct. Linoleic or linolenic acids are exemplary of unsaturated fatty acids.

---

Figure 1:
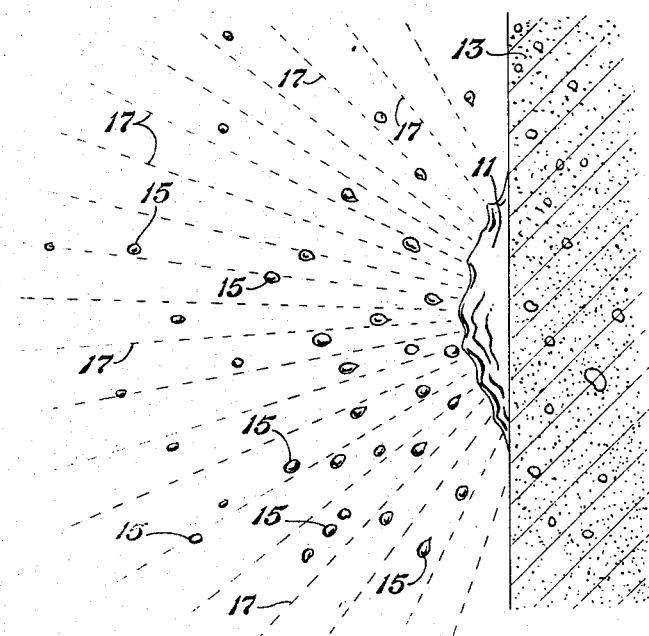

This invention relates to gels, and more specifically, but without limitation, relates to gels which have utility as flames fuel for fire bombs and the like.

Various jelly-like materials have been used as flame fuels in prior art. These flame fuels have been generally deficient for many applications because they are normally shear thinning, i.e. they are essentially thixotropic and tend to liquify substantially on impact. An example of such a material is a napalm flame fuel (hereinafter called napalm). Prior to impact, napalm is a jelly-like mass. Under the application of high impact forces, napalm becomes a thin liquid disperses rapidly in diverse directions. While the effect of napalm in a bomb on impact is quite spectacular, the fireball formed consumes all of the useable fuel present in a very rapid flash as a result of the liquification referred to above. The total flame time of such a bomb is considerably less than it should be for results in most applications.

Accordingly, it is an object of the instant invention to produce a gel having utility, for example, as a flame fuel in a fire bomb, which flame fuel will produce hot flame lasting for a substantial period of time compared to the conventional shear thinning materials such a napalm. More specifically, it is an object of the present invention to provide an essentially non-thixotropic flame fuel which on high impact will spread into a mass that tends to adhere to the impact surface, that is coherent in nature, i.e. that tends to stick together into a unitary. though highly plastic non-elastic mass, and that spreads from the central area of its impact with an object in accordance with a pendicular, finger-like pattern and without substantial fuel splattering, mists and vapor formtaion.

It is an additional object of the present invention to provide a simple and economical, yet effective process for making such a flame fuel from readily available materials.

In accordance with the present invention a gel is provided which comprises a normally-liquid organic material bound into a matrix comprising the reaction product of an unsaturated fatty acid, an aqueous solution of a base selected from the group consisting of sodium hydroxide and ammonium hydroxide, and a surfactant in the presence of the normally-liquid organic material. The surfactant posesses the property of promoting the dispersion of a discontinuous aqueous phase throughout a continuous liquid organic phase.

In a specific preferred embodiment of the instant invention, a coherent, stringy, adherent, non-thixotropic flame fuel is produced by reacting a minor proportion of an unsaturated fatty acid, preferably containing at least 2 carbon to carbon double bonds and having 18 carbon atoms per molecule, with a minor proportion of a concentrated aqueous solution of sodium hydroxide, the sodium hydroxide solution being preferably in excess of about 25% by weight concentration, in the presence of a minor proportion of a surfactant selected from the group consisting of N-substituted polyamines in which the substituent has at least 16 carbon atoms and ethylene oxide adducts, said adducts being the reaction product formed from ethylene oxide and an organic compoun of at least 12 carbon atoms, an in the presence of a conventional liquid organic fuel such as JP-4 or kerosene. Quite speficially, preferred surfactants include N-tallow propylene diamine, N-oleyl propylene diamine, and an ethylene oxide adduct of dehydroabietyl amine.

Figure 2:
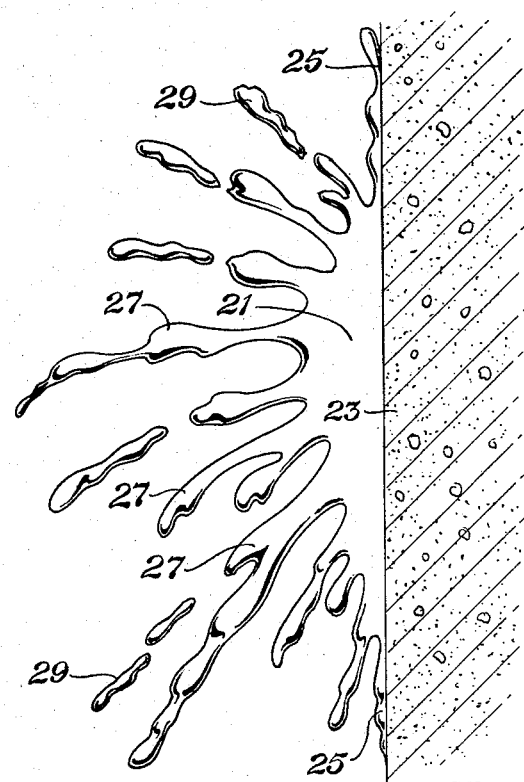

A more complete understanding of the present invention and appreciation of further objects, advantages, and aspects thereof may be had by considering the following description and specific examples, taken in conjunction with the accompanying drawings in which:

FIGURE 1 is a schematic illustration of the nature of the result of impact of a mass of napalm against a wall, and FIGURE 2 is a schematic illustration of the nature of the result of impact of a mass of the flame fuel of the instant invention against a wall.

Referring in more detail to FIGURE 1, therein is presented an illustration of the pattern of dispersion and physical state of napalm an instant after impact with a hard surface. Reference numeral 11 indicates the position of the napalm that has not yet disintegrated or substantially dispersed. It is in contact with the wall 13. A large part of the original napalm present just prior to impact has dispersed or separated as the result of the impact into very small particles, as illustrated at 15, which deflect rapidly outwardly from the point of impact. In addition, a very large part of the original material present becomes a fine mist; a substantial part even vaporizes. Small particles of mist and quantities of vapor are schematically indicated in FIGURE 1 by the short dashed lines 17. The flame produced by the impacted napalm of FIGURE 1 is quite spectacular since a very rapid flash is produced. A characteristic maximum flame time would be around 15 to 20 seconds. It is seen that flame produced from the impacted napalm of FIGURE 1 will rise rapidly outwardly and/or upwardly from the point of impact.

FIGURE 2 schematically represents the pattern of dispersion and the physical state of the flame fuel of this invention an instant after impact with a hard surface. Therein, the numeral 21 indicates the central mass of the flame fuel lying against and adhering to the wall 23. Note that while the flame fuel has spread out rather widely, its coherent, stringy, non-thixotropic, adherent characteristics have caused it to remain in a generally unitary mass having spread portions, such as portions 25, in adherence with the wall and a multiplicity of pendular, tentacle-like portions 27 extending outwardly from, but still unitary with the main body of the mass 21. Some particles, such as 29, separate from the mass and move outwardly as a result of impact. These particles are relatively large and few in number compared to the particles 15 in FIGURE 1. Very little mist or vapor is produced by the impact. A flame produced by the impacted flame fuel of FIGURE 2 characteristically burns for at least about one minute, compared to the 15 to 20 seconds of the napalm fuel of FIGURE 1. Moreover, the flame does not move rapidly away from the impacted area, but produces thereon, and in the close proximity thereto, a sustained, hot fire. Such a sustained burning is quite valuable for most applications and is particularly effective to produce greater damage in military applications.

The following examples are offered in illustration of the gel of this invention, and the method of making that gel, but they are not intended to be taken as limiting.

Example 1

Four milliliters of a fatty acid mixture are added to 100 milliliters of JP-4 jet fuel. The fatty acid mixture is essentially unsaturated, containing approximately 86% by weight oleic acid, 6% by weight linoleic acid and only about 8% saturates (primarily myristic acid and palmitic acid). Such a fatty acid mixture may be obtained commercially from Armour Chemical Company under the trade name "Neo Fat 94-04." To the jet fuel and acid are added one milliliter of a 70% by weight solution in isopropanol of the ethylene oxide adduct obtained on addition of 5 moles of ethylene oxide per mole of dehydroabietylamine. To the resulting mixture is added one milliliter of a 50% by weight aqueous solution of sodium hydroxide.

On the completion of the addition of constituents, the resulting mixture is shaken to provide considerable agitation. While a stirrer may be used at various constituent concentration levels, it is preferred, except at higher concentration levels, that agitation be provided by other means (shaking, for example) to minimize the tendency of the forming gel to break down as a result of the comparatively high shear imparted by an agitator.

After a short period of shaking, on the order of about one minute, a highly viscous, coherent, stringy, adherent, plastic gel forms from the foregoing components. The gel, on testing, is found to be essentially non-thixotropic and to function well as a flame fuel, spreading on impact against a hard surface generally in accordance with the pattern illustrated in FIGURE 2. The flame effect, in terms of burning time and confinement to the desired area, is found to be quite superior to napalm used in a comparative test.

Example 2

Example 1 is repeated except in place of the surfactant therein employed, one gram of N-tallow propylene diamine (obtainable commercially from the Armour Chemical Company as Duomeen T) is used. A similar product results to that obtained in Example 1, although the characteristics of the Example 1 product are somewhat better.

Example 3

Example 1 is repeated, except that the surfactant therein employed is replaced by one gram of N-olelic propylene diamine (obtainable commercially from Armour Chemical Company as "Duomeen O"). The resulting product is similar to that obtained in Example 2, however, its characteristics are not quite so good as those of the Example 2 product. Nevertheless, it demonstrates marked superiority to napalm for flame fuel purposes.

Example 4

Example 1 is repeated, except in place of the aqueous sodium hydroxide solution, a 28% by weight aqueous solution of ammonium hydroxide is employed. The resulting product is considerably less satisfactory than obtained in Examples 1-3, but still possess the general flame fuel characteristics of this invention though being somewhat marginal. Nevertheless, the product functions satisfactorily as a flame fuel and is superior, for many applications, to napalm.

Example 5

Example 1 is repeated, except 5 milliliters of 10% sodium hydroxide are utilized in place of the one milliliter of 50% by weight sodium hydroxide therein employed. The resulting product does not give a stringy, coherent gel.

Example 6

Example 1 is repeated except that kerosene is used in place of the JP-4 jet fuel therein employed. A satisfactory product, quite similar to that obtained in Example 1, results.

Example 7

Example 1 is repeated, except that 100 milliliters of high octaine gasoline are used in place of the JP-4 jet fuel therein employed. The product obtained is quite satisfactory, being similar to the product of Example 1.

Example 8

Fourteen milliliters of the unsaturated fatty acid mixture described in Example 1 are added to 100 milliliters of kerosene. Also, 5 milliliters of the ethylene oxide adduct solution (70% solution of the adduct in isopropanol) referred to in Example 1 are added to the kerosene, as is 3.4 grams of N-tallow propylene diamine. While stirring the resulting mixture with a standard motor-driven laboratory agitator, 4 milliliters of 50% by weight aqueous sodium hydroxide solution are added. A satisfactory stringy gel, quite similar to the product of Example 1, results. Its characteristics as a flame fuel are comparable to those of the product of Example 1.

Example 9

The prior example is repeated except the sodium hydroxide is left out of the mixture. A stringy gel product does not form.

Example 10

Example 8 is repeated, except that instead of the unsaturated acid mixture therein employed, 14 milliliters of saturated fatty acid (a mixture of myristic, palmitic and stearic acids in approximately equal portions) is used. A stringy gel does not form.

Example 11

The prior example is repeated except that the acid mixture utilized contains approximately 75% by weight polyunsaturated acids (linolenic and linoleic acids in about equal proportions), the remaining 25% being made up of equal proportions of palmitic, myristic and stearic acids. A satisfactory gel is obtained, the product being similar to that of Example 1.

Example 12

The procedure of Example 1 is repeated except the fatty acid mixture used therein is replaced by 15 milliliters of commercial grade oleic acid. Four milliliters of 50% by weight concentration aqueous sodium hydroxide solution are used in place of the one milliliter employed in Example 1. Moreover, 4 grams of N-tallow propylene diamine are substituted in place of the ethylene oxide adduct of Example 1. A good stringy gel flame fuel product of generally similar characteristics to that of Example 1 is obtained.

Example 13

The procedure of Example 1 is repeated except that for the 4 milliliters of the fatty acid mixture are substituted 4 milliliters of lineoleic acid. A very good stringy gel product having highly desirable flame fuel characteristics is obtained.

Example 14

The preceding example is repeated except that a 50% mixture of linoleic and linolenic fatty acids is substituted for the linoleic acid therein employd. A similar product to that the preceding example is obtained.

Example 15

Example 1 is repeated except that 1½ milliliters of the fatty acid mixture was used in place of the 4 milliliters employed therein. Moreover, the quantity of solution of ethylene oxide adduct surfactant of that example is lowered to ¹⁄₁₀ milliliter. The quantity of base of 50% by weight sodium hydroxide solution is lowered to ¼ milliliter. A stringy gel flame fuel product is obtained, although the characteristics of the gel are not quite so good as for the product of Example 1. At substantially lower concentrations than utilized in this example, it appears that the gel becomes too thin for most applications as a flame fuel.

Example 16

Example 1 is repeated except that for the fatty acid, the ethylene oxide adduct, and the sodium hydroxide solution used therein, the following are substituted: 5 milliliters of a mixture of 50% by weight of oleic and 50% by weight of lineoleic acids; 1¼ milliliters of the ethylene oxide adduct of Example 1; and 2 milliliters of 25% by weight aqueous solution of sodium hydroxide. A stringy gel resulted having satisfactory flame fuel characteristics.

From the foregoing examples, it is seen that at least some unsaturated fatty acid is required to make a satisfactory gel product. Best results appear to be obtained when an appreciable percentage of a polyunsaturated fatty acid component is present. Thus, the presence of linoleic and linolenic acids, for example, appear to enhance the characteristics of the gel product. Nevertheless, mono-unsaturated fatty acid is seen to be operative.

The foregoing examples indicate that when the aqueous sodium hydroxide solution concentration is as low as 10% by weight an unsatisfactory product results. On the other hand, a 25% sodium hydroxide solution is seen to give a product with good characteristics. While, with special agitation and great care, it appears possible to obtain product with the weaker hydroxide concentrations, it is regarded as highly desirable, if not essential, that a certain minimum concentration of aqueous solution sodium hydroxide is used. The same generalization appears to apply to ammonium hydroxide. It appears that on the order of about 5 molar concentration of base is the minimum concentration of base which should be used for effective results when employing direct mixing procedures. Moreover, it is desirable that the base be even stronger than this, preferably that it be in excess of 25% by weight concentration in aqueous solution. As a practical matter, upper concentration limits of the base are set by solidifying characteristics of the solution. Thus, sodium hydroxide solutions in excess of about 50% are found to be solids at room temperatures. Consequently, the preferred range of weight concentration of aqueous solution of the base is from about 25% to about 50%.

The preferred minimum total quantity of sodium hydroxide is about 0.05 mole per liter of liquid fuel to be solidified. For example, using 50% by weight aqueous sodium hydroxide, at least about ¼ milliliter of base per 100 milliliters of liquid fuel is needed to make a gel having desirable characteristics for most applications.

The surfactant utilized in this invention possesses the property of promoting the dispersion of a discontinuous aqueous phase throughout a continuous liquid organic phase (i.e. the fuel) which is in itself substantially water insoluble or immiscible. Moreover, it appears that the surfactant is cationic or non-ionic in nature. While it is not established with any certainty, it further appears likely that the surfactant involved may enter into the gel-forming reaction in some way, perhaps as a cross-linking agent; at least it appears to serve as a reaction promoter. The table herebelow shows a variety of surfactants which may be used.

TABLE

| Trade name and supplier | Composition [1] |
| --- | --- |
| Amine 0 (Geigy) | Heptadecenyl imidazoline. |
| OX-126 (Aquaness) | Nonyl phenol + 4 E.O. |
| Tergitol NP-14 (Union Carbide) | Do. |
| Tergitol TMN (Union Carbide) | Trimethyl nonyl ether of polyglycol trimethyl nonal +12 E.O. |
| Duomeen T (Armour) | N-tallow propylene diamine. |
| Duomeen C (Armour) | N-cocoa propylene diamine. |
| Ethofat 242/25 (Armour) | 70% rosin acids +15 E.O. |
| Ethoduomeen T/13 (Armour) | N-tallow propylene diamine +3 E.O. |
| Ethomid RO/15 (Armour) | Red oil (oleyl) amide +5 E.O. |
| Ethomeen S/15 (Armour) | Soybean amine +5 E.O. |
| Emulphor EL719 (Antara) | Polyoxyethylated vegetable oil. |
| Surfonic N-10 (Jefferson) | Nonyl phenol +1 E.O. |
| Surfonic N-20 (Jefferson) | Nonyl phenol +2 E.O. |
| Surfonic N-40 (Jefferson) | Nonyl phenol +4 E.O. |
| Surfonic N-95 (Jefferson) | Nonyl phenol +9.5 E.O. |
| Surfonic LF-7 (Jefferson) | Aliphatic alcohol-ethylene oxide adduct modified by termination with a hydrophobic group. |
| Dowfax 9N10 (Dow Chemical) | Nonyl phenol +10 E.O. |
| I-5 (The Western Company) | 70% by weight in isopropanol of dehydroabietylamine +5 E.O. |

[1] The phrase "+(n) E.O." designates the number of moles of ethylene oxide per mole of the other constituent referred to in the ethylene oxide adduct identified.

It is preferred that the quantity of surfactant employed be no less than about 1 part per 1000 parts (by weight) of liquid fuel used in the gel.

The upper quantity of the acid, base and surfactant involved in this invention appears to aggregate approximately a total of 50% by weight of the mixture. That is, at least 50% of the mixture should be fuel, it being permissible for the balance to be made up of the acid, base and surfactant. Thus, a major proportion of fuel is involved in conjunction with minor proportions of the other constituents.

The fuel may be selected from a wide variety of substances. Jet fuel (e.g. JP-4 and JP-5), kerosene, gasoline, and various other fuels are satisfactory. It is not intended that light, water miscible fuels, such as lower alcohols, be employed.

The stringy, coherent characteristics of the gel of this invention are quite surprising since gels based on sodium soaps of fatty acids are ordinarily expected to have a grainy, applesauce-like consistency. The coherent nature of the present gel is quite striking: if a handful of it is thrown against a surface, it can be retrieved in a substantially unitary mass by seizing a part of the gel and pulling it from the surface. If a large quantity of the subject gel is present in a storage vat and a quantity is grasped by one hand and pulled outwardly away from the vat, a long, continuous rope of the gel is pulled from the vat. On examination, the rope of material is seen to be made up of a large number of stringy, strand-like portions. The gel is thus seen to be plastic, coherent, and stringy in nature. Moreover, it is rather adherent in nature since a mass of it thrown against a wall tends to cling to the wall. All of the foregoing characteristics are significant in making the gel of this invention valuable as a flame fuel.

Having described the invention in connection with certain specific embodiments thereof, it is to be understood that further modifications may now suggest themselves to those skilled in the art and it is intended to cover such modifications as fall within the scope of the appended claims.

What is claimed is:

1. A gel comprising a normally liquid water immiscible organic fuel material bound into a matrix comprising the reaction product obtained by mixing effective gelling proportions of the following: unsaturated fatty acid, an aqueous solution of a base selected from the group consisting of sodium hydroxide and ammonium hydroxide and a surfactant in the presence of said normally liquid water immiscible organic fuel material, said surfactant possessing the property of promoting the dispersion of a discontinuous aqueous phase throughout a continuous liquid organic phase to form a stringy, coherent, adherent, non-thixotropic gel capable of forming pendular, tentacle-like portions on impact with an object.

2. The gel of claim 1 in which the aqueous solution of said base has a molarity of at least about 5.

3. The gel of claim 2 in which said base is sodium hydroxide and in which the concentration of said aqueous solution thereof ranges between about 25% and 50% by weight.

4. The gel of claim 3 in which the total quantity of sodium hydroxide is no less than about 0.05 mole per liter of the normally liquid organic material and in which the total quantity of unsaturated fatty acid is no less than about 1½% by volume, based on the volume of said normally liquid organic material.

5. A stringy, coherent, adherent, non-thixotropic gel comprising a major proportion, at least 50 percent by weight based on the total gel weight, of a normally liquid water immiscible organic fuel bound into a matrix formed by reacting a minor but effective proportion of unsaturated fatty acid, a minor proportion of a base selected from the group consisting of sodium hydroxide and ammonium hydroxide in the presence of said organic fuel and a minor but effective proportion of a surfactant possessing the property of promoting the dispersion of a discontinuous aqueous phase throughout a continuous liquid organic, generally water immiscible fuel phase, said surfactant being selected from the group consisting of an N-substituted polyamine in which the substituent has at least about 16 carbon atoms and of ethylene oxide adducts, said adducts being the reaction products of ethylene oxide and an organic compound which has at least about 12 carbon atoms.

6. The gel of claim 5 in which the aqueous solution of said base has a molarity of at least about 5.

7. The gel of claim 6 in which said base is sodium hydroxide and in which the concentration of said aqueous solution thereof ranges between about 25% and 50% by weight.

8. The gel of claim 7 in which said surfactant is an ethylene oxide adduct of dehydroabietylamine.

9. The gel of claim 7 in which said surfactant is N-tallow propylene diamine.

10. The gel of claim 7 in which said surfactant is N-oleyl propylene diamine.

11. The gel of claim 7 in which said unsaturated fatty acid has 18 carbon atoms in its molecule.

12. The gel of claim 11 in which said unsaturated fatty acid is selected from the group consisting of linoleic and linolenic acid.

13. The gel of claim 7 wherein the total quantity of sodium hydroxide is no less than about 0.05 mole per liter of said normally liquid organic fuel, wherein the total quantity of unsaturated fatty acid is no less than about 1½% by volume, based on the volume of said normally liquid organic fuel, and wherein the quantity of surfactant employed is no less than about 1 part per thousand, based on the weight of said normally liquid organic fuel.

References Cited

UNITED STATES PATENTS

| | | | |
|---|---|---|---|
| 2,386,805 | 10/1945 | Laliberte | 44—7 |
| 2,390,609 | 12/1945 | Minich | 44—7 |
| 2,570,990 | 10/1951 | Southern et al. | 44—7 |
| 2,769,697 | 11/1956 | Goldenson | 44—7 |
| 2,828,265 | 3/1958 | Van Strien | 44—7 |
| 2,860,103 | 11/1958 | Buchanan et al. | 44—7 |
| 2,958,665 | 11/1960 | Stefcik et al. | 44—7 |

DANIEL E. WYMAN, *Primary Examiner.*

C. F. DEES, *Assistant Examiner.*